United States Patent Office 3,396,170
Patented Aug. 6, 1968

3,396,170
ALUMINUM HYDRIDE TETRAZOLE COMPLEXES AND SYNTHESIS THEREOF
Neil R. Fetter, Arlington, Calif., and Bodo K. W. Bartocha, Indian Head, Md., assignors to the United States of America as represented by the Secretary of the Navy
No Drawing. Filed Apr. 3, 1962, Ser. No. 184,859
14 Claims. (Cl. 260—299)

The invention described herein may be manufactured and used by or for the Government of the United States of America for governmental purposes without the payment of any royalties thereon or therefor.

The present invention relates to aluminum hydride tetrazole complexes and to the synthesis thereof from the reaction of aluminum hydride with substituted tetrazoles.

It is therefore an object of the present invention to provide a simple process for preparing aluminum hydride tetrazole complexes from the reaction of aluminum hydride with substituted tetrazoles which may have use as rocket fuels and components for explosives.

Another object of this invention is to provide a process for preparing aluminum hydride tetrazole complexes which have physical characteristics suitable for propellant additives.

In accordance with the present invention aluminum hydride tetrazole complexes may be prepared by the reaction of a substituted tetrazole selected from a group comprising 2-methyltetrazole, 2-ethyltetrazole, 5-ethyltetrazole, 2-methyl-5-vinyltetrazole, 2-ethyl-5-aminotetrazole, 1-alkyl-5-aminotetrazole, and 2-methyl-5-cyanotetrazole with a member selected from a group consisting essentially of aluminum hydride etherate and aluminum hydride trimethylamine. The reaction is accomplished by distilling one of the tetrazoles onto the selected aluminum hydride in vacuo by heating to a temperature ranging from 80°–90° C., depending upon which liquid tetrazole is used. The flask containing the hydride is kept at −196° C. during the distillation and allowed to warm slowly until the tetrazole melts, or if diethyl ether is employed as a solvent, brought to −78° C. for 30 minutes and then allowed to warm gradually to room temperature. After the reaction is complete, the ether, excess tetrazole, and aluminum hydride are removed by vacuum.

The following examples serve to illustrate how the present invention may be carried out in practice; however, the invention is not restricted to the examples.

EXAMPLE I

Aluminum hydride etherate and 2-ethyl-5-aminotetrazole

A 200 ml. solution of aluminum hydride etherate was prepared by mixing 3.9 grams of aluminum hydride in a 200 ml. ether solution containing 3.2 grams of lithium aluminum hydride. The mixture was filtered after stirring for half an hour to remove the insoluble lithium chloride. 4.684 grams of 2-ethyl-5-aminotetrazole dissolved in approximately 50 ml. of diethyl ether was added to the prepared aluminum hydride etherate at room temperature. A precipitate formed immediately which was filtered, washed with fresh ether and filtered again. Residual ether was removed from the precipitate under vacuum. The reaction may be represented as follows:

$$AlH_3(C_2H_5O)_n + C_3H_7N_5 \rightarrow AlH_3C_3H_7N_5 + nC_2H_5O$$

An elemental analysis of the product gave the following results:
Calculated: Al=20.37%; C=25.24%; H=6.21%; N=21.97%. Found: Al=19.10%; C=25.53%; H=5.71%; N=49.80%.

The calculated values are based on a 1:1 complex with the formula $AlH_3 \cdot C_3H_7N_5$.

EXAMPLE II

Aluminum hydride trimethylamine and 2-ethyl-5-aminotetrazole 6.856 grams of 2-ethyl-5-aminotetrazole was vacuum distilled into a 50 ml. flask containing 2.0 grams of aluminum hydride trimethylamine, $AlH_3:N(CH_3)_3$, at −78° C. The mixture was allowed to warm to room temperature slowly for 30 minutes. Trimethylamine was evolved during reaction and the excess tetrazole was removed by vacuum after gas evolution ceased. The product was a brittle, slightly yellow solid. This reaction may be represented by the following equation:

$$H_3Al:N(CH_3)_3 + C_3H_7N_5 \rightarrow H_3Al:C_3H_7N_5 + N(CH_3)_3$$

EXAMPLE III

Aluminum hydride etherate and 2-methyl-5-cyanotetrazole

Starting with 7.0 grams of aluminum chloride ($AlCl_3$) and using the procedure recited in Example I above an ether solution of aluminum hydride etherate was prepared having a volume of 200 ml. 10.83 grams of 2-methyl-5-cyanotetrazole dissolved in 50 ml. of ether was added slowly to the aluminum hydride etherate solution. The mixture was kept at 0° C. during the addition. After the tetrazole was added the mixture was stirred for 10 minutes and the excess ether and tetrazoles were removed under vacuum. The product was a light-yellow-brown solid which burns vigorously in air and is very shock sensitive.

The reaction is $$2AlH_3(C_2H_5O)_n + C_3H_3N_5 \rightarrow (AlH_3)_2C_3H_3N_5 + 2_nC_2H_5O$$

An elemental analysis gave values calculated on a 2:1 complex with the formula $(AlH_3)_2C_3H_3N_5$ as follows:
Calculated: Al=28.36%; C=19.50%; H=4.31%; N=30.74%. Found: Al=31.89%; C=21.30%; H=5.36%; N=41.44%.

EXAMPLE IV

Aluminum hydride trimethylamine and 2-methyl-5-cyanotetrazole 0.3530 gram of aluminum hydride trimethylamine, $AlH_3:N(CH_3)$, dissolved in 30 ml. of heptane is cooled to −196° C., and 0.9520 gram of 2-methyl-5-cyanotetrazole is vacuum distilled into the mixture. The solution is allowed to warm slowly to room temperature for 30 minutes. When the evolution of trimethylamine has ceased, the solvent and excess tetrazole are removed under vacuum. The product is a light-yellow-brown solid.

The reaction may be represented as follows:

$$2AlH_3N(CH_3)_3 + C_3H_3N_5 \rightarrow (AlH_3)_2C_3H_3N_5 + 2N(CH_3)_3$$

EXAMPLE V

Aluminum hydride etherate and 2-methyl-5-vinyltetrazole

Starting with 1.00 grams of aluminum chloride ($AlCl_3$) and using the procedure described in Example I, 50 ml. of an ether solution of aluminum hydride was prepared. To this solution was added 1.268 grams of 2-methyl-5-vinyltetrazole dissolved in 20 ml. of ether. The mixture was stirred for 30 minutes and left for 18 hours for the reaction to go to completion. The solution was filtered, the product washed with fresh ether, and dried under vacuum. The product is a white solid. An elemental analysis gave the following result based on 1:1 complex with the formula $AlH_3:C_4H_6N_4$.
Calculated: Al=22.61%; C=30.43%; H=6.27%; N=35.71%. Found: Al=19.25%; C=34.31%; H=6.43%; N=40.00%.

The reaction may be set out as:

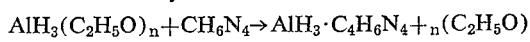

EXAMPLE VI

Aluminum hydride trimethylamine and 2-methyl-5-vinyltetrazole 3.528 grams of 2-methyl-5-vinyltetrazole was vacuum distilled into a flask containing 2.90 grams of aluminum hydride trimethylamine. The distillation temperature was 90° C. with the receiver at −78° C. The mixture was allowed to warm slowly to room temperature and, after an hour, when the evolution of trimethylamine ceased, the remaining 2-methyl-5-vinyltetrazole was removed by vacuum. The reaction is $AlH_3:N(CH_3)_3 + C_4H_6N_4 \rightarrow AlH_3 \cdot C_4H_6N_4 + N(CH_3)_3$ No elemental analysis available, but the infrared spectrum was the same as the product in Example V above.

EXAMPLE VII

Aluminum hydride etherate and 2-methyltetrazole

Starting with 13.50 grams of aluminum chloride ($AlCl_3$) and using the same procedure described in Example I, 200 ml. of aluminum hydride etherate solution was prepared. To this was added 100 ml. of an ether solution of 2-methyltetrazole. The solution was stirred and kept at 0° C. during the addition. After stirring for an additional half hour the solution was filtered into a 500 ml. flask and the solvent and excess tetrazole removed by vacuum. It should be noted that in the dry condition this product is unstable and may explode violently at any time after becoming dry. (Most explosions occurred after about one hour.) This complex was too unstable to analyze or to characterize.

EXAMPLE VIII

Aluminum hydride etherate and 2-ethyltetrazole

Starting 1.00 grams of aluminum chloride ($AlCl_3$) and employing the procedure described in Example I, 25 ml. of aluminum hydride etherate solution was prepared. To this was added dropwise 1.85 grams of 2-ethyltetrazole dissolved in 25 ml. of ether. The mixture was kept at −5° C. during the addition and then was stored at this temperature for 18 hours. The solution was then filtered and the ether and any unreacted tetrazole were removed under vacuum at room temperature. This material would explode spontaneously when dry, but at no predictable time after drying. A carbon-hydrogen analysis gave the following results for a 1:1 complex with the formula $H_3Al:C_3H_6N_4$.

Calculated: C=27.48%; H=9.20%. Found: C=27.21%; H=8.42%.

The complexes of this invention are all solids which will not sublime and cannot be distilled. A search for a solvent from which it would be possible to recrystallize these compositions reveals that halogen and oxygen containing solvents do not appear to be satisfactory candidates as solvents; and amides or solvents containing the $CONH_2$ group may be quite hazardous if they come in contact with complexes of the type described herein.

Various modifications are contemplated and may obviously be resorted to by those skilled in the art without departing from the spirit and scope of the invention as set forth in the appended claims.

What is claimed is:

1. A process for the preparation of aluminum hydride tetrazole complexes comprising adding a member selected from the group consisting essentially of aluminum hydride etherate and aluminum hydride trimethylamine to a member selected from the group consisting of 2-methyltetrazole, 2-ethyltetrazole, 5-ethyltetrazole, 2-methyl-5-vinyltetrazole, 2-ethyl-5-aminotetrazole, 1-alkyl-5-aminotetrazole, and 2-methyl-5-cyanotetrazole at a reaction temperature ranging from 0° to −196° C., warming to room temperature, and stirring for about 30 minutes until a precipitate forms.

2. A process for the preparation of an aluminum hydride tetrazole complex from the reaction of aluminum hydride etherate with 2-ethyl-5-aminotetrazole comprising adding aluminum hydride etherate to 2-ethyl-5-aminotetrazole at a reaction temperature of about 25° C. and stirring until a precipitate forms.

3. A process for the preparation of an aluminum hydride tetrazole complex of aluminum hydride trimethylamine and 2-ethyl-5-aminotetrazole comprising adding 2-ethyl-5-aminotetrazole to aluminum hydride trimethylamine at a reaction temperature of −78° C., warming to room temperature for about 30 minutes until a brittle, slightly yellow solid forms.

4. A process for the preparation of an aluminum hydride tetrazole complex comprising adding slowly 2-methyl-5-cyanotetrazole to an aluminum hydride etherate at a reaction temperature of 0° C., and stirring for about 10 minutes until a light-yellow-brown precipitate forms.

5. A process for the preparation of an aluminum hydride tetrazole complex from aluminum hydride trimethylamine and 2-methyl-5-cyanotetrazole comprising adding aluminum hydride trimethylamine to 2-methyl-5-cyanotetrazole at a reaction medium of about −196° C., warming slowly to room temperature and filtering the precipitate when evolution of trimethylamine has ceased.

6. A process for the preparation of an aluminum hydride tetrazole of aluminum hydride etherate and 2-methyl-5-vinyltetrazole comprising adding aluminum hydride etherate to 2-methyl-5-vinyltetrazole, stirring for about 30 minutes at room temperature, and storing for about 18 hours at ambient temperature until a white precipitate forms.

7. A process for the preparation of an aluminum hydride tetrazole comprising distilling 2-methyl-5-vinyltetrazole into aluminum hydride trimethylamine at −78° C., warming slowly to room temperature, and filtering the precipitate when evolution of trimethylamine almost ceases.

8. A process for the preparation of an aluminum hydride tetrazole complex from aluminum hydride etherate and 2-methyltetrazole comprising adding 2-methyltetrazole to aluminum hydride etherate at a reaction temperature of 0° C., stirring for about 30 minutes until a precipitate forms.

9. A process for the preparation of an aluminum hydride tetrazole complex from aluminum hydride etherate and 2-ethyltetrazole comprising adding 2-ethyltetrazole to aluminum hydride etherate at a reaction temperature of −5° C. and storing at said −5° C. for 18 hours until a precipitate forms.

10. An aluminum hydride complex with a member selected from the group consisting of 2-methyltetrazole, 2-ethyltetrazole, 5-ethyltetrazole, 2-methyl-5-vinyltetrazole, 2-ethyl-5-aminotetrazole, 1-alkyl-5-aminotetrazole, and 2-methyl-5-cyanotetrazole.

11. An aluminum hydride complex with 2-ethyl-5-aminotetrazole.

12. An aluminum hydride complex with 2-methyl-5-cyanotetrazole.

13. An aluminum hydride complex with 2-methyl-5-vinyltetrazole.

14. An aluminum hydride complex with 2-ethyltetrazole.

No references cited.

ALTON D. ROLLINS, *Primary Examiner*.